(12) United States Patent
Tanimori et al.

(10) Patent No.: US 11,360,479 B2
(45) Date of Patent: Jun. 14, 2022

(54) TRAFFIC INFORMATION DETERMINATION DEVICE, TRAFFIC INFORMATION SYSTEM, AND METHOD OF DETERMINING TRAFFIC INFORMATION USING PROCESSOR

(71) Applicant: TOYOTA JIDOSHA KABUSHIKI KAISHA, Toyota (JP)

(72) Inventors: Shunsuke Tanimori, Susono (JP); Michio Ikeda, Nagoya (JP); Masaki Wasekura, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 358 days.

(21) Appl. No.: 16/534,184

(22) Filed: Aug. 7, 2019

(65) Prior Publication Data

US 2020/0117202 A1 Apr. 16, 2020

(30) Foreign Application Priority Data

Oct. 16, 2018 (JP) .............................. JP2018-195368

(51) Int. Cl.
*G05D 1/02* (2020.01)
*G08G 1/01* (2006.01)
*G08G 1/00* (2006.01)

(52) U.S. Cl.
CPC .......... *G05D 1/0214* (2013.01); *G08G 1/0141* (2013.01); *G08G 1/207* (2013.01); *G05D 2201/0213* (2013.01)

(58) Field of Classification Search
CPC .......... G05D 1/0214; G05D 2201/0213; G08G 1/0141; G08G 1/207; G08G 1/202; G08G 1/127; G01C 21/3822; G01C 21/3461
See application file for complete search history.

(56) References Cited

U.S. PATENT DOCUMENTS

2017/0277191 A1* 9/2017 Fairfield ................ G08G 1/202

FOREIGN PATENT DOCUMENTS

JP 2018-018423 A 2/2018

* cited by examiner

*Primary Examiner* — Yuen Wong
(74) *Attorney, Agent, or Firm* — Sughrue Mion, PLLC

(57) ABSTRACT

A traffic information determination device includes a server configured to acquire driving environment information that may affect safety of traveling of a vehicle to be subjected to autonomous driving control, determine a first allowable area in which traveling of the vehicle is allowed, and in which traveling of the vehicle is not allowed when a person gets on the vehicle, based on the driving environment information, and determine a second allowable area in which traveling of the vehicle is allowed, and in which traveling of the vehicle is allowed even when the person gets on the vehicle, based on the driving environment information.

7 Claims, 10 Drawing Sheets

TRAFFIC INFORMATION DETERMINATION DEVICE, TRAFFIC INFORMATION SYSTEM, AND METHOD OF DETERMINING TRAFFIC INFORMATION USING PROCESSOR

INCORPORATION BY REFERENCE

The disclosure of Japanese Patent Application No. 2018-195368 filed on Oct. 16, 2018 including the specification, drawings and abstract is incorporated herein by reference in its entirety.

BACKGROUND

1. Technical Field

The present disclosure relates to a traffic information determination device, a traffic information system, and a method of determining traffic information using a processor.

2. Description of Related Art

In related art, an autonomous driving vehicle in which driving of the vehicle is performed through autonomous driving control has been developed. In a vehicle to be subjected to the autonomous driving control, driving manipulations such as driving, steering, and braking performed by a person in the related art are performed by the vehicle.

The autonomous driving vehicle acquires a position of the autonomous driving vehicle using a positioning sensor or the like and travels autonomously along a route based on stored map information. In this case, the autonomous driving vehicle travels safely while avoiding other vehicles or obstacles by acquiring information on surroundings using sensors such as cameras and radars.

Therefore, it is desirable for the information on the surroundings to be able to be accurately acquired in order to secure safe traveling of the autonomous driving vehicle.

For example, from the viewpoint of securing safety of occupants getting on the autonomous driving vehicle, providing an area in which traveling of the autonomous driving vehicle is allowed been proposed (for example, Japanese Unexamined Patent Application Publication No. 2018-018423 (JP 2018-018423 A)).

SUMMARY

Even in a case in which the autonomous driving vehicle travels in an area in which information on surroundings can be acquired accurately, the autonomous driving vehicle may be suddenly braked and decelerated, for example, when the autonomous driving vehicle travels along a route with many steep slopes or curves such as mountain roads. Such an operation of the autonomous driving vehicle can affect riding feeling of the autonomous driving vehicle for occupants.

Therefore, it is desirable for an autonomous driving vehicle to travel in an area in which occupants can be given a safe getting-on feeling when traveling with persons got on the vehicle.

The present disclosure a traffic information determination device capable of determining an area in which an occupant can be given a safe getting-on feeling for an autonomous driving vehicle on which a person gets and that travels, and enabling the autonomous driving vehicle to travel in the determined area, a traffic information system, and a method of determining traffic information using a processor.

A first aspect of the present disclosure relates to a traffic information determination device includes a server. The server is configured to: acquire driving environment information that affects safety of traveling of a vehicle to be subjected to autonomous driving control, determine a first allowable area in which traveling of the vehicle is allowed, and in which traveling of the vehicle is not allowed when a person gets on the vehicle, based on the driving environment information, and determine a second allowable area in which traveling of the vehicle is allowed, and in which traveling of the vehicle is allowed even when the person gets on the vehicle, based on the driving environment information.

A second aspect of the present disclosure relates to a traffic information system. The traffic information includes a vehicle configured to perform autonomous driving control; and a server including a communication device. The server is configured to acquire driving environment information that affects safety of traveling of the vehicle, determine a first allowable area in which traveling of the vehicle is allowed, and in which traveling of the vehicle is not allowed when a person gets on the vehicle, based on the driving environment information, determine a second allowable area in which traveling of the vehicle is allowed, and in which traveling of the vehicle is allowed even when the person gets on the vehicle, based on the driving environment information, and transmit the first allowable area and the second allowable area to the vehicle via the communication device; and the vehicle is configured to communicate with the server, be allowed to travel within the first allowable area and the second allowable area when no person gets the vehicle, and be allowed to travel within the second allowable area when a person gets on the vehicle.

A third aspect of the present disclosure relates to a method of determining traffic information using a processor. The method includes determining, by the processor, a first allowable area in which traveling of a vehicle to be subjected to autonomous driving control is allowed, and in which traveling of the vehicle is not allowed when a person gets on the vehicle, based on the driving environment information that affects safety of traveling of the vehicle; and determining, by the processor, a second allowable area in which traveling of the vehicle is allowed, and in which traveling of the vehicle is allowed even when the person gets on the vehicle, based on the driving environment information.

According to each aspect of the present disclosure, an area in which the occupant is given a safe getting-on feeling is determined, and the autonomous driving vehicle is enabled to travel in the determined area.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, preferred embodiments of a traffic information system disclosed in the present specification will be described with reference to the drawings. However, a technical scope of the present disclosure is not limited to those embodiments and is intended to cover the disclosures described in the claims and equivalents thereof.

Figure 1:
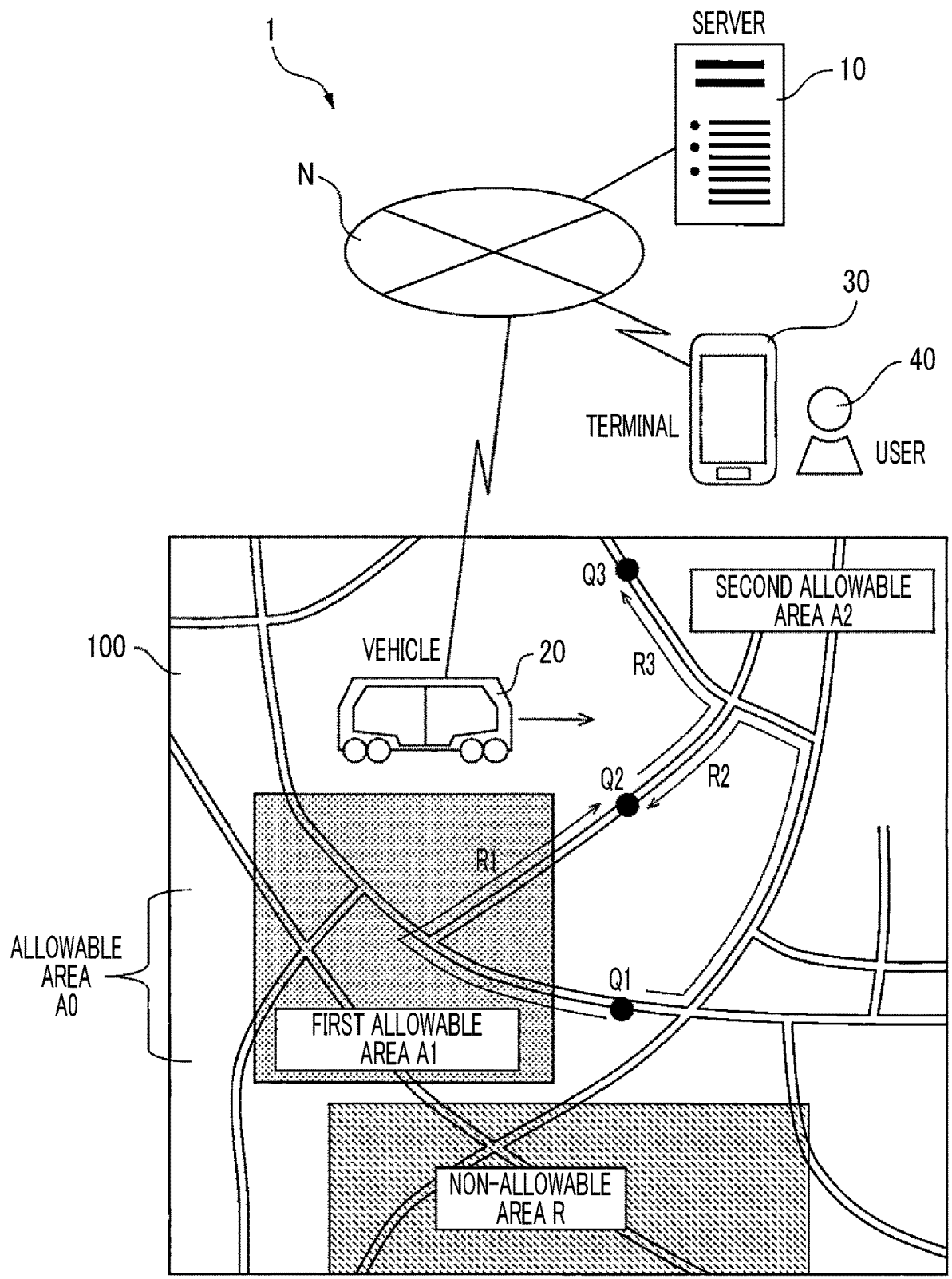
FIG. 1 is a diagram illustrating a configuration of an embodiment of a traffic information system of the present disclosure.

FIG. 1 is a diagram illustrating a configuration of an embodiment of the traffic information system of the present disclosure.

In the traffic information system disclosed in the present specification, a server divides an area in which traveling of the autonomous driving vehicle is allowed into a first allowable area in which the travelling of the vehicle is not allowed when a person gets on the vehicle and a second allowable area in which the travelling of the vehicle is allowed even when a person gets on the vehicle, based on driving environment information that can affect safety of traveling of the autonomous driving vehicle, and determines the areas. The autonomous driving vehicle travels in the second allowable area when the person gets on the vehicle, thereby giving occupants a safe getting-on feeling.

The traffic information system 1 (hereinafter also simply referred to as a "system 1") of the embodiment includes a server 10, a vehicle 20 to be subjected to autonomous driving control, and a terminal 30 manipulated by a user 40. The server 10 is communicatively connected to a vehicle 20 and the terminal 30 via a network N via a wireless base station (not illustrated).

The vehicle 20 is an autonomous driving vehicle that provides a service (mobility service) as mobility such as a taxi, a bus, and a ride share. Although one vehicle 20 is illustrated in FIG. 1, the system 1 may include a plurality of vehicles.

The server 10 determines an area in which traveling of the vehicle 20 is allowed, which is a first allowable area A1 in which the travelling of the vehicle 20 is not allowed when a person gets on the vehicle, based on driving environment information that may affect the safety of traveling of the vehicle 20 to be subjected to autonomous driving control at predetermined intervals or at any point in time. Further, the server 10 determines an area in which traveling of the vehicle 20 is allowed, which is a second allowable area A2 in which the travelling of the vehicle 20 is allowed when the person gets on the vehicle, based on the driving environment information together with the first allowable area A1.

Examples of the driving environment information include weather information, traffic information, time information, and region information. Details of the driving environment information will be described below.

As illustrated in FIG. 1, the server 10 separately determines an area in the map 100 into the first allowable area A1 and the second allowable area A2, and a non-allowable area R in which travelling of the vehicle 20 to be subjected to autonomous driving control is not allowed.

The server 10 transmits information indicating the first allowable area A1 and the second allowable area A2 to the vehicle 20 via the network N. The vehicle 20 transmits current position information, a traveling speed, and occupant information indicating the presence or absence of an occupant to the server 10 via the network N at predetermined intervals or at any point in time.

The vehicle 20 can travel in an allowable area A0 including the first allowable area A1 and the second allowable area A2. In the first allowable area A1, travelling of the vehicle 20 is allowed when no person gets on the vehicle, but is not allowed to travel when the person gets on the vehicle. On the other hand, in the second allowable area A2, travelling of the vehicle 20 is allowed even when a person gets on the vehicle as well as when no person gets on the vehicle. The travelling of the vehicle 20 is not allowed in the non-allowable area R.

The user 40 using the vehicle 20 transmits information indicating a current location and a destination to the server 10 via the network N, together with a vehicle dispatch request for requesting transfer of the user 40 from the current location to the destination using the terminal 30.

The server 10 that has received the vehicle dispatch request searches the first route along which the vehicle 20 travels from a current location Q1 to a current location Q2 of the user 40 for the vehicle 20, based on a road in the first allowable area A1 and/or the second allowable area A2. When the vehicle 20 is unmanned, the first route may include a route R1 in the first allowable area A1 and the second allowable area A2. On the other hand, when a person gets on the vehicle 20, the first route may include a route R2 in the second allowable area A2. Further, the server 10 searches for a second route R3 along which the vehicle 20 travels from the current location Q2 of the user 40 to a destination Q3 based on roads in the second allowable area A2 with respect to the vehicle 20 on which the user 40 has got.

The server 10 transmits a transfer request for requesting the vehicle 20 to move to the current location of the user 40 and transfer the user 40 getting on the vehicle to the destination to the vehicle 20 via the network N together with information indicating the first route and the second route.

The vehicle 20 having received the transfer request moves to the current location of the user 40, causes the user 40 to get on the vehicle, and transfers the user 40 to the destination.

The system 1 will be described in more detail below.

The server 10 includes a controller 11, a storage unit 12, a display unit 13, a manipulation interface (I/F) 14, and a communication interface (I/F) 15.

Figure 2:
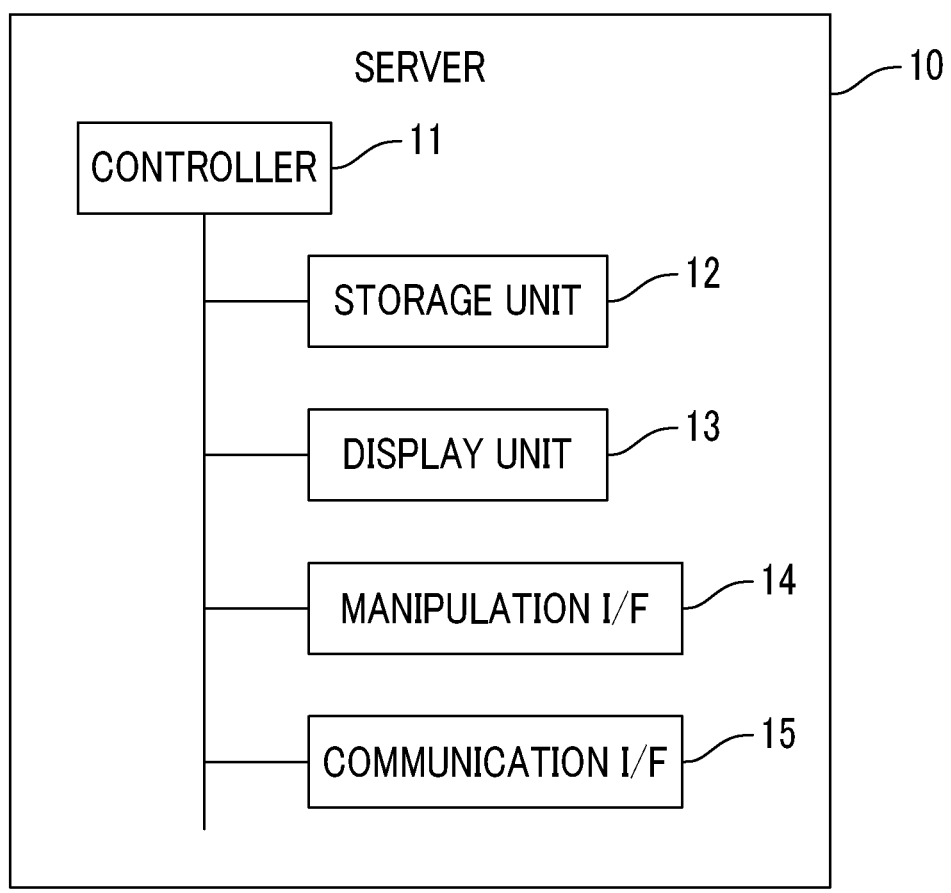
FIG. 2 is a hardware configuration diagram of a server.
Figure 3A:
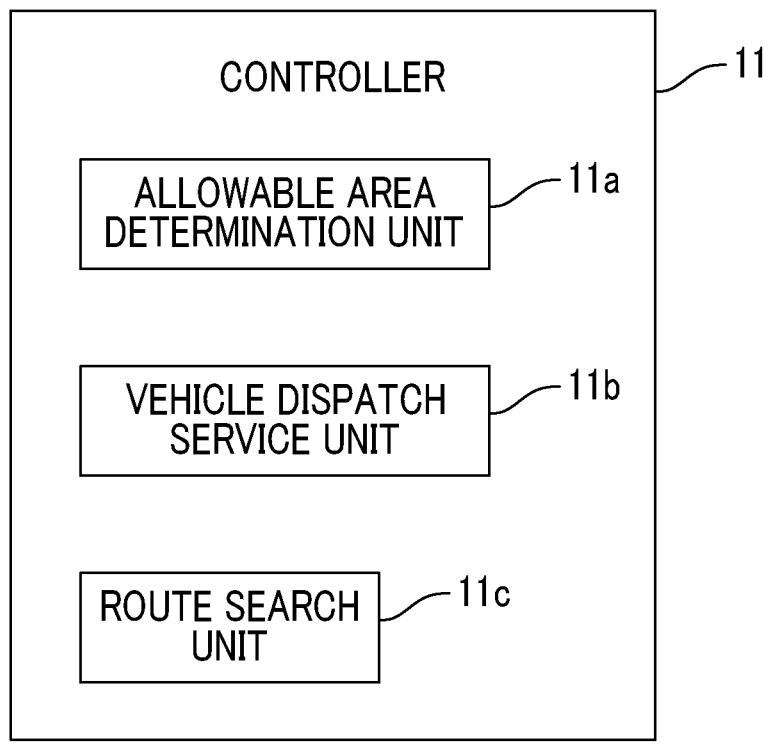
FIG. 3A is a functional block diagram of a controller of a server.
Figure 3B:
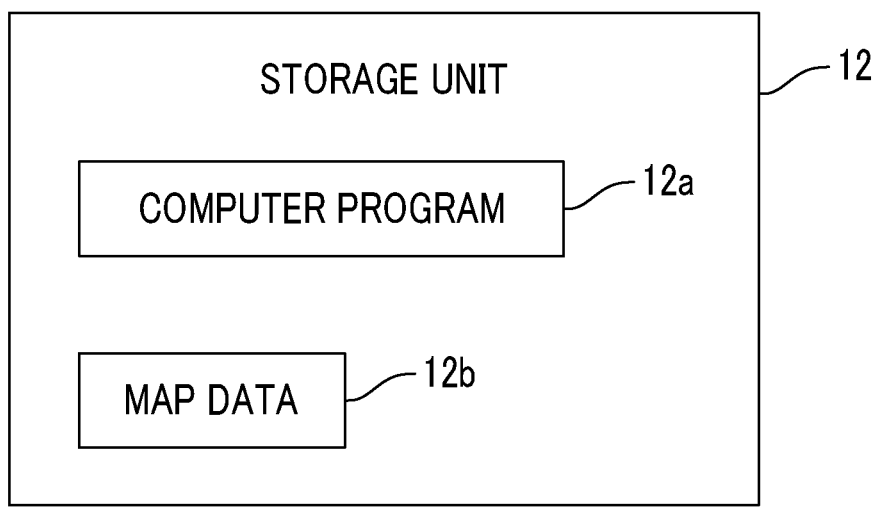
FIG. 3B is a diagram illustrating a storage unit of the server.

FIG. 2 is a hardware configuration diagram of the server 10. FIG. 3A is a functional block diagram of the controller 11 of the server 10, and FIG. 3B is a diagram illustrating a storage unit of the server 10.

The controller 11 includes one or more processors that execute computer programs that perform control and calculation in the server 10, and peripheral circuits thereof. The controller 11 includes an allowable area determination unit 11a, a vehicle dispatch service unit 11b, and a route search unit 11c. The allowable area determination unit 11a, the vehicle dispatch service unit 11b, and the route search unit 11c are realized, for example, as a software module or firmware that is executed on a processor. Processes to be performed by the allowable area determination unit 11a, the vehicle dispatch service unit 11b, and the route search unit 11c will be described below. These units included in the controller 11 may be mounted on the server 10 as separate circuits.

The storage unit 12 includes a storage medium such as a hard disk drive (HDD), an optical recording medium, or a semiconductor memory, and stores the computer program 12a to be executed by the controller 11. The storage unit 12 also stores data generated by the controller 11 or data received by the controller 11 via the network N. The storage unit 12 also stores map data 12b. The map data 12b has map information. Further, the map information includes information on a node indicating an intersection or the like in a road, and information on a link indicating a section of a road connecting adjacent nodes. Further, the map information includes positional information on nodes and links. Further, a route along which the vehicle 20 travels is formed by connecting links connecting adjacent nodes. Further, it is desirable for the map data 12b to have legal speed information associated with each link. Further, it is desirable for the map data 12b to have information indicating a curvature radius of a road, a slope of a road, and a state of a road surface of a road. As the information indicating the road surface state of the road, for example, a three-step index such as good (0), normal (0.5), and bad (1) may be used. Further, it is desirable for the map data 12b to have information indicating a state of security. As the information indicating the state of security, for example, the number of occurrences of murder, robbery, arson, burglary, and the like can be used. Further, the storage unit 12 stores information on the vehicle 20 such as current position information, traveling speed, and occupant information.

The display unit 13 can be controlled by the controller 11 to be able to display various pieces of information associated with the operation of the server 10. For example, a liquid crystal display can be used as the display unit 13.

The manipulation I/F 14 is manipulated by a manager of the server 10 and can input a manipulation. For example, a keyboard, a mouse, or a touch panel integrated with the display unit 13 can be used as the manipulation I/F 14.

The communication I/F 15 includes a communication I/F circuit for connecting the server 10 to the network N, for example, via a gateway. The communication I/F 15 is configured to be able to communicate with the vehicle 20 via the network N.

Figure 4:
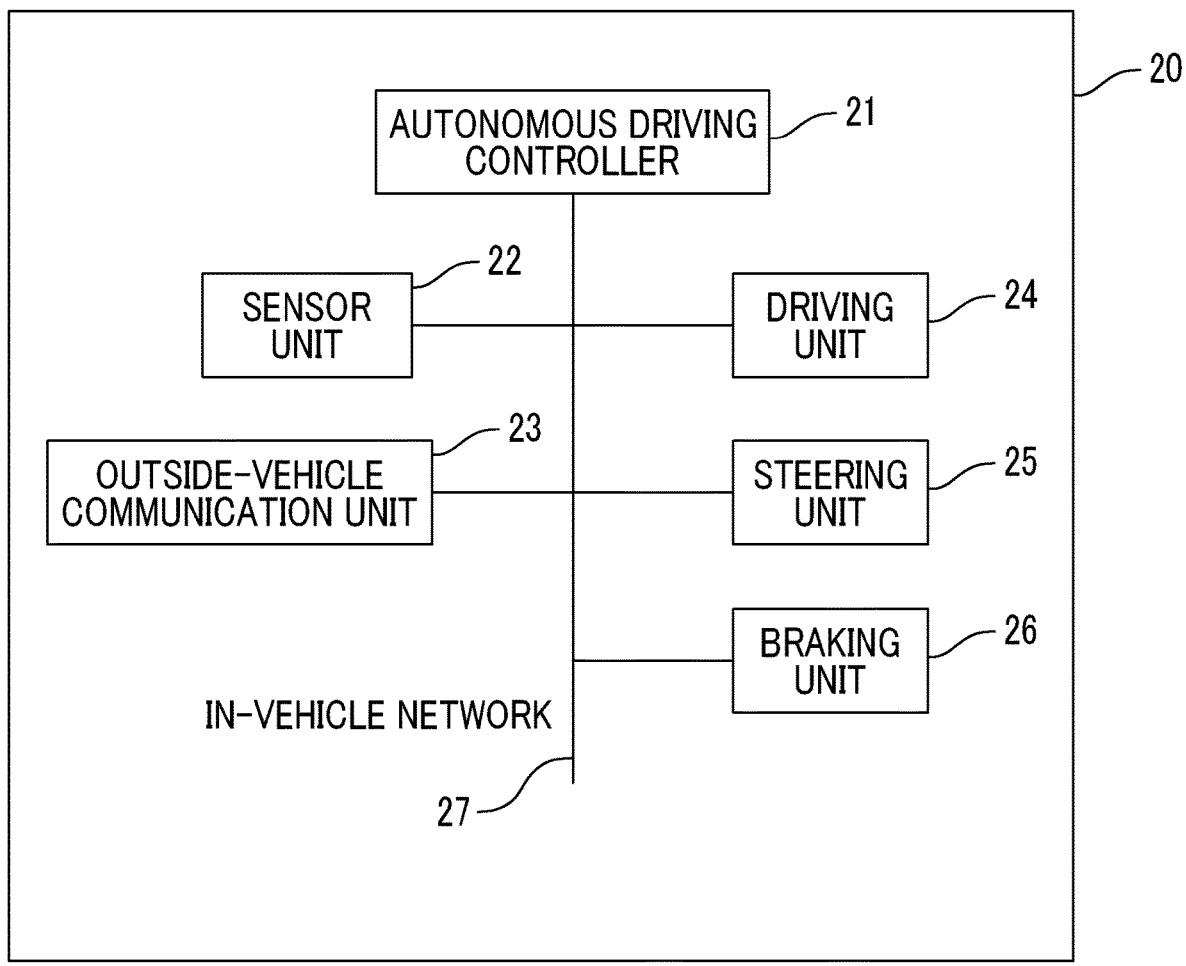
FIG. 4 is a hardware configuration diagram of a vehicle.

FIG. 4 is a hardware configuration diagram of the vehicle.

The vehicle 20 includes an autonomous driving controller 21, a sensor unit 22, an outside-vehicle communication unit 23, a driving unit 24, a steering unit 25, and a braking unit 26, which are connected to each other via an in-vehicle network 27. As the in-vehicle network 27, for example, a network conforming to a controller area network (CAN) standard can be used.

The autonomous driving controller 21 outputs a control signal generated for movement to a destination along a route to the driving unit 24, the steering unit 25, and the braking unit 26 based on the vehicle environment information input from the sensor unit 22, to control an operation of the vehicle. The route of the vehicle 20 may be generated by a navigation unit (not illustrated) included in the vehicle 20 based on a current location and a destination input by the occupant. Further, the autonomous driving controller 21 may receive information indicating a route generated by the server 10.

The sensor unit 22 transmits the acquired vehicle environment information to the autonomous driving controller 21 via the in-vehicle network 27. The sensor unit 22 includes, for example, an outside-vehicle camera, an in-vehicle camera, a distance measurement sensor, a positioning sensor, a vehicle speed sensor, and a yaw rate sensor. The outside-vehicle camera images surroundings of the vehicle 20 and outputs an image of the surroundings. The in-vehicle camera images the inside of the vehicle 20 and outputs an image thereof. The autonomous driving controller 21 determines the presence or absence of the occupant based on the image captured by the in-vehicle camera and generates occupant information. The distance measurement sensor measures and outputs a distance to an object present in front of the vehicle 20 for each direction. As the distance measurement sensor, for example, a light detection and ranging (LIDAR) sensor can be used. The positioning sensor generates and outputs position information indicating a current position of the vehicle 20. As the positioning sensor, for example, a global positioning system (GPS) receiver can be used. The vehicle speed sensor detects information on a traveling speed of the vehicle 20. As the vehicle speed sensor, for example, a rotation speed sensor for an axle can be used. The yaw rate sensor detects an angular velocity of the vehicle. For example, a gyro sensor can be used as the yaw rate sensor.

The outside-vehicle communication unit 23 is an in-vehicle communication device having a wireless communication function. The outside-vehicle communication unit 23, for example, is connected to the network N via a wireless base station (not illustrated) connected via the network N, a gateway, and the like (not illustrated) by accessing the wireless base station.

The driving unit 24 generates a driving force of the vehicle 20 based on the control signal to accelerate the vehicle. The driving unit 24 includes, for example, an engine that is an internal combustion engine, or an electric motor.

The steering unit 25 determines a traveling direction of the vehicle based on a control signal. The steering unit 25 has a steering mechanism that controls directions of wheels of the vehicle 20.

The braking unit 26 generates a braking force of the vehicle 20 based on a control signal. The braking unit 26 includes, for example, a brake disc, a brake caliper, and a hydraulic mechanism.

Figure 5:
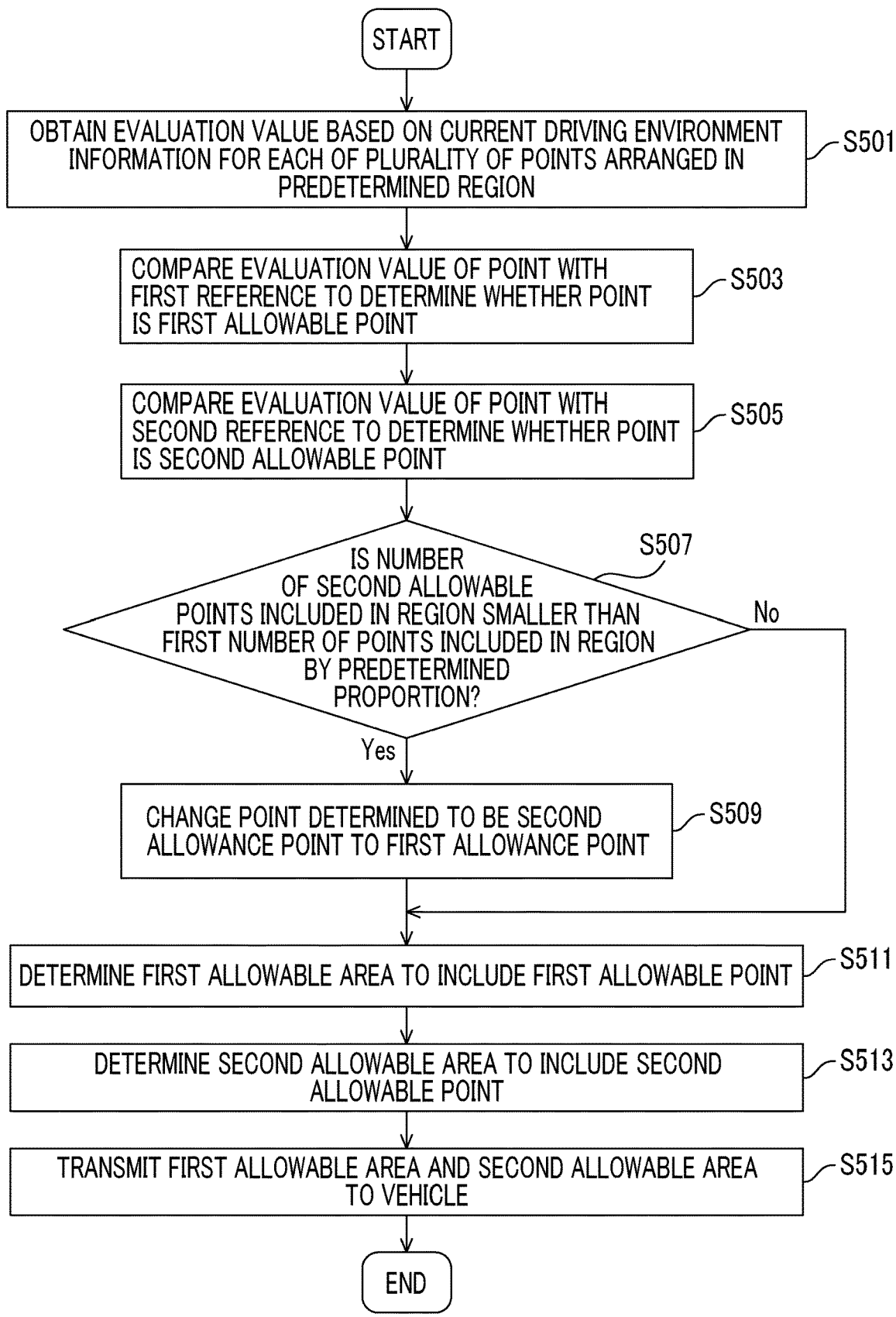
FIG. 5 is a flowchart (1) illustrating an operation of the server.

Next, a first processing example in which the server 10 in the system 1 described above determines the first allowable area A1 and the second allowable area A2 based on the driving environment information will be described below with reference to the flowchart illustrated in FIG. 5.

First, in step S501, the allowable area determination unit 11a of the controller 11 in the server 10 obtains an evaluation value based on current driving environment information for each of a plurality of points disposed in a predetermined region. Based on the evaluation value, the allowable area determination unit 11a determines whether each point is a point at which traveling of the vehicle 20 is allowed, which is a point at which traveling of the vehicle 20 is not allowed when a person gets on the vehicle, or a point at which traveling of the vehicle 20 is allowed, which is a point at which traveling of the vehicle 20 is allowed even when a person gets on the vehicle. A point other than such points forms a non-allowable area.

The predetermined region is a defined area on a map in which the vehicle 20 can travel. The predetermined region may be, for example, one local public entity or a plurality of adjacent local public entities.

Points located in the predetermined region are used to determine the first allowable area A1 and the second allowable area A2 to include points at which the vehicle can travel. A distance between adjacent points can be, for example, in a range of 10 m to 1000 m.

As described above, the weather information, the traffic information, the time information, and the region information can be used as the driving environment information.

Examples of the weather information may include precipitation, rainfall, snowfall, heavy rain warning, surface rainfall index, river flood forecast, earth and sand disaster warning information, tornado warning information, large tsunami warning, tsunami warning, tsunami warning, eruption warning, eruption forecast, ash fall forecast, volcanic gas forecast, tide observation information, and wave warning.

Since information on the position and surroundings of the vehicle 20 obtained by the vehicle 20 is likely to be affected by rain or snow at a point at which the precipitation is large, it is desirable for travelling of the vehicle 20 to be allowed at a point at which the precipitation is not large.

Similarly, it is desirable for the travelling of the vehicle 20 to be allowed at a point at which there is no possibility of being affected by flooding, landslide, strong wind, tsunami, cinder, or ash fall.

Further, the vehicle 20 may skid depending on a state of rainwater or snow on a road surface even at a point at which the precipitation is not large. The vehicle 20 can also travel while comparing the angular velocity of the vehicle with a steering angle for controlling the steering unit 25 to detect skidding of the vehicle 20 and reducing a speed so that the vehicle 20 does not skid. However, when the vehicle 20 is suddenly decelerated, the occupant is likely to feel uncomfortable with a behavior of the vehicle 20. Therefore, at a point at which the precipitation is not large, it is desirable to distinguish between a case in which a person gets on the vehicle and a case in which no person gets on the vehicle with respect to whether or not traveling of the vehicle 20 is allowed based on a degree of precipitation, from the viewpoint of giving occupants a safe getting-on feeling. It is desirable for the precipitation in which traveling of the vehicle 20 is allowed when the person gets on the vehicle to be smaller than the precipitation in which traveling of the vehicle 20 is allowed when the person does not get on the vehicle.

From the same point of view, at the point at which there is no possibility of being affected by flooding, landslide, strong wind, tsunami, cinder, or ash fall, it is desirable to distinguish between a case in which a person gets on the vehicle and a case in which no person gets on the vehicle with respect to whether or not traveling of the vehicle 20 is allowed based a wind speed or a degree of ash fall, from the viewpoint of giving occupants a safe getting-on feeling.

The server 10 can acquire weather information that is provided by a public organization or a private organization, via the network N. Further, the manager of the server 10 may input the weather information to the server 10. The manipulation I/F 14 and the communication I/F 15 are examples of an information acquisition unit that is used for the server 10 to acquire the driving environment information.

Examples of the traffic information may include a traffic volume or traveling speed at a point at which the vehicle 20 can travel. Many vehicles may be traveling at points at which the traffic volume is large (a traveling speed is slower than a legal speed), and vehicles other than autonomous driving vehicles may be traveling. For example, the vehicle 20 is likely to perform sudden braking with respect to unexpectable travelling of vehicles other than the autonomous driving vehicle. Further, an occupant getting on the vehicle 20 is likely to feel uncomfortable while seeing the traveling of vehicles other than the autonomous driving vehicle. Therefore, it is desirable for traveling of the vehicle 20 to be allowed at a point at which the traffic volume is not large.

Further, it is desirable to distinguish between a case in which a person gets on the vehicle and a case in which no person gets on the vehicle with respect to whether or not traveling of the vehicle 20 is allowed based on a degree of traffic volume at a point at which the traffic volume is not large, from the viewpoint of giving occupants a safe getting-on feeling. It is desirable for the traffic volume in which travelling of the vehicle 20 is allowed when the person gets on the vehicle is smaller than the traffic volume in which travelling of the vehicle 20 is allowed when no person gets on the vehicle.

The server 10 can acquire the traffic information that is provided by the public organization or the private organization, via the network N. Further, the manager of the server 10 may input the traffic information to the server 10. Further, the vehicle 20 may transmit information indicating a current traveling speed to the server 10 via the network N together with the point at which the vehicle 20 travels so that the server 10 acquires the traveling speed at each point.

Examples of the time information may include a time zone at daytime of a point. For example, when information on surroundings acquired by the vehicle 20 is affected by brightness, it is desirable for the traveling of the vehicle 20 to be allowed in a bright time zone.

Further, when sunlight is radiated from a low angle as in a dawn or evening time even when a point is in a time zone at daytime, an occupant of the vehicle 20 is likely to feel the sunlight dazzled. Therefore, in the time zone at daytime of the point, it is desirable to further divide the time zone and distinguish between a case in which a person gets on the vehicle and a case in which no person gets on the vehicle with respect to whether or not traveling of the vehicle 20 is allowed, from the viewpoint of giving occupants a safe getting-on feeling. For example, it is desirable for traveling of the vehicle 20 on which a person gets not to be allowed when the point is in a dawn or evening time even in the time zone at daytime.

The server 10 can acquire the time information that is provided by the public organization or the private organization, via the network N. Further, the manager of the server 10 may input the time information to the server 10.

Examples of the region information may include a school route, and position information of a place at which construction is being performed. It is desirable for the travelling of the vehicle 20 to be allowed in a time zone other than a time to attend a school at a point at which a primary school student or the like uses to attend a school. Further, it is desirable for traveling of the vehicle 20 to be allowed at a point at which no construction is being performed.

Further, at the point at which the primary school student or the like uses to attend a school, it is considered that a child is highly likely to pass in a predetermined time zone before and after the time to attend a school even in the time zone other than the time to attend a school. For example, at a point at which the primary school student or the like, a child is likely to suddenly jump on a road and the vehicle 20 is likely to be suddenly braked even in the predetermined time zone before and after the time to attend a school. Therefore, in the predetermined time zone before and after the time to attend a school for a point included in the school route, it is desirable to distinguish between a case in which a person gets on the vehicle and a case in which no person gets on the vehicle with respect to whether or not traveling of the vehicle 20 is allowed, from the viewpoint of giving occupants a safe getting-on feeling. The time zone before and after the time to attend a school may be, for example, 30 minutes before and after the time to attend a school.

Further, an example of the region information may include disposition information of a facility that supports traveling of an autonomous driving control vehicle. An example of the disposition information may include information on an area in which a beacon device that transmits a state of a signal to the vehicle 20 is disposed. At a point included in the area in which the beacon device is disposed, the vehicle 20 receives information transmitted from the beacon device using a beacon receiver (not illustrated). The vehicle 20 can determine the state of the signal based on information transmitted from the beacon device together with an image of the signal captured by an outside-vehicle camera. However, at a point included in an area in which the beacon device is not disposed, there is no information transmitted from the beacon device, and the vehicle 20 determines the state of the signal based on the image of the signal captured by the outside-vehicle camera. Therefore, it is desirable for traveling of the vehicle 20 to be allowed at a point included in the area in which the beacon device that transmits the state of the signal to the vehicle 20 is disposed.

From the viewpoint of securing safe traveling of the vehicle 20 on which a person gets, it is desirable for the number of facilities supporting the traveling of the autonomous driving control vehicle to be large. In the area in which a plurality of facilities supporting traveling of the autonomous driving control vehicle is disposed, the vehicle 20 can control an operation of the vehicle based on more vehicle environment information, and therefore, it is considered that an opportunity to perform sudden braking or the like is reduced as compared with an area in which one facility is disposed. Therefore, it is desirable to distinguish between a case in which a person gets on the vehicle and a case in which no person gets on the vehicle with respect to whether or not traveling of the vehicle 20 is allowed based on the number of facilities, from the viewpoint of giving occupants a safe getting-on feeling. It is desirable for the number of facilities in which traveling of the vehicle 20 is allowed when a person gets on the vehicle to be larger than the number of facilities in which traveling of the vehicle 20 is allowed when no person gets on the vehicle.

Further, an example of the region information may include information on the area in which map information is maintained. When the vehicle 20 travels at a point included in the area in which the map information is maintained, the vehicle 20 can control traveling based on the map information together with information on surroundings acquired using a sensor. However, there is no map information at a point included in an area in which the map information is not maintained, and the vehicle 20 controls traveling based on the information on the surroundings acquired using the sensor. Therefore, it is desirable for traveling of the vehicle 20 to be allowed at a point included in the area in which the map information is maintained.

From the viewpoint of securing the safe traveling of the vehicle 20 on which a person has got, it is desirable for a creation period of time of the map information to be new. information on newly constructed roads or the like is likely not to be included in old map information. For example, when the vehicle 20 is traveling based on the old map information, an occupant is likely to question the travelling of the vehicle 20 when the vehicle 20 does not travel on the road not included in the map information since the road is not included in the map information in spite of the fact that the vehicle can earlier reach a destination when the vehicle travels on the road not included in the map information. Therefore, it is desirable to distinguish between a case in which a person gets on the vehicle and a case in which no person gets on the vehicle with respect to whether or not traveling of the vehicle 20 is allowed based on the period of time when the map information has been created, from the viewpoint of giving occupants a safe getting-on feeling. It is desirable for a period of time when the map information in which travelling of the vehicle 20 is allowed when a person gets on the vehicle has been created to be newer than a period of time when the map information in which travelling of the vehicle 20 is allowed when a person does not get on the vehicle has been created. Here, the map information of which the period of time of creation is old may be map information created three years before a current point in time, and the map information of which the period of time of creation is new may be map information created within three years from the current point in time.

Further, examples of the region information may include information on a curvature radius of the road, a slope of the road, and a state of a road surface. When the vehicle 20 travels on a road with a small curvature radius, the occupant is likely to receive a large centrifugal force. Further, when the vehicle 20 travels on a steep slope, the occupant is likely to have trouble maintaining a posture. Further, when the vehicle 20 travels on an unpaved road, the occupant is likely to receive large shaking. Therefore, it is desirable for travelling of the vehicle 20 to be allowed in an area in which the curvature radius is not small, an area in which the slope is not large, and an area in which the road surface state is not bad.

Further, in a point included in the area in which the curvature radius is not small, an area in which the slope is not large, and an area in which the road surface state is not bad, it is desirable to distinguish between a case in which a person gets on the vehicle and a case in which no person gets on the vehicle with respect to whether or not traveling of the vehicle 20 is allowed based on the curvature radius, the slope, and the road surface state, from the viewpoint of giving occupants a safe getting-on feeling. It is desirable for the curvature radius in which travelling of the vehicle 20 is allowed when the person gets on the vehicle to be greater than the curvature radius in which travelling of the vehicle 20 is allowed when the person does not get on the vehicle. It is desirable for the slope in which travelling of the vehicle 20 is allowed when the person gets on the vehicle to be smaller than the slope in which travelling of the vehicle 20 is allowed when the person does not get on the vehicle. It is desirable for the state of the road surface on which travelling of the vehicle 20 is allowed when the person gets on the vehicle to be better than the state of the road surface on which travelling of the vehicle 20 is allowed when the person does not get on the vehicle.

Further, an example of the region information may include information on a state of security. When the vehicle 20 travels in an unsafe area, an occupant is likely to feel unsafe. Therefore, it is desirable for traveling of the vehicle 20 to be allowed at a point included in the area in which the security state is not bad.

Further, at the point included in the area in which the state of security is not bad, it is desirable to distinguish between a case in which a person gets on the vehicle and a case in which no person gets on the vehicle with respect to whether or not traveling of the vehicle 20 is allowed based on a degree of the security, from the viewpoint of giving occupants a safe getting-on feeling.

The region information described above, for example, is associated with a point at which the vehicle 20 can travel, and is input to the server 10 by the manager of the server 10.

The allowable area determination unit 11a may obtain an evaluation value based on a plurality of pieces of driving environment information described above. For example, the allowable area determination unit 11a can obtain an evaluation value f using Equation (1) below.

$$f=F(\alpha,\beta,\gamma,\delta) \quad (1)$$

Here, α is a value that is determined based on the weather information at the point. For example, when the precipitation is greater than a first threshold value, α may be set to 1, when the precipitation is equal to or smaller than the first threshold value and equal to or greater than a second threshold value smaller than the first threshold value, α may be set to 0, and when the precipitation is smaller than the second threshold value, α may be set to 0.5. Further, a surface rainfall index may be used as α. Further, the allowable area determination unit 11a may determine α based on a plurality of pieces of weather information including the precipitation, heavy rain warning, and a surface rainfall index.

β is a value that is determined based on the traffic information at the point. For example, β may be a traffic volume or traveling speed at the point. Here, when the traffic volume is greater than a first threshold value, β may be set to 1, when the traffic volume is equal to or smaller than the first threshold value and equal to or greater than a second threshold value smaller than the first threshold value, β may be set to 0.5, and when the traffic volume is smaller than the second threshold value, β may be set to 0. Further, when the traveling speed is smaller than a first threshold value, β may be set to 1, when the traveling speed is equal to or greater than the first threshold value and equal to or smaller than a second threshold value greater than the first threshold value, β may be set to 0.5, and when the traveling speed is greater than the second threshold value, β may be set to 0. Further, the allowable area determination unit 11a may determine β based on a plurality of pieces of traffic information including a traffic volume and traveling speed.

γ is a value determined based on time information of a point. For example, when the time of the point is a time zone at night, γ may be set to 1, when the time of the point is a time zone at daytime and is a dawn or evening time, γ may be set to 0.5, and when the time of the point is a time zone at daytime and is a time other than dawn or evening, γ may be set to 0.

δ is a value determined based on the region information of the point. For example, when the point is included in a school route and the time of the point is a time zone to attend a school, δ may be set to 1, when the point is included in the school route and the time of the point is a predetermined time zone before and after the time zone to attend a school, δ may be set to 0.5, and when the point is not included in the school route or the point is included in the school route but the time of the point is not a time zone to attend a school and a predetermined time zone before and after the time zone to attend a school, δ may be set to 0. When the point is included in an area under construction, δ may be set to 1, and when the point is not included in the area under construction, δ may be set to 0. Further, when the point is included in an area in which a facility supporting travelling of the autonomous driving control vehicle is not disposed, δ may be set to 1, when the point is included in the area in which one facility is disposed, δ may be set to 0.5, and when the point is included in an area in which a plurality of the facilities is disposed, δ may be set to 0. Further, when the point is included in an area in which map information is not maintained, δ may be set to 1, when the point is included in an area in which map information of which a creation period of time is old is maintained, δ may be set to 0.5, and when the point is included in an area in which map information of which a creation period of time is new is maintained, δ may be set to 0. Further, the allowable area determination unit 11a may determine δ based on a plurality of pieces of region information.

Further, when the curvature radius of the point is smaller than a first threshold value, δ may be set to 1, when the curvature radius of the point is equal to or greater than the first threshold value and equal to or smaller than a second threshold value greater than the first threshold value, δ may be set to 0.5, and when the curvature radius of the point is greater than the second threshold value, δ may be set to 0. When the slope of the point is greater than a first threshold value, δ may be set to 1, when the slope of the point is equal to or smaller than the first threshold value and equal to or greater than a second threshold value smaller than the first threshold value, δ may be set to 0.5, and when the slope of the point is smaller than the second threshold value, δ may be set to 0. When an index indicating the state of the road surface is greater than a first threshold value, δ may be set to 1, when the index indicating the state of the road surface is equal to or smaller than the first threshold value and equal to or greater than a second threshold value smaller than the first threshold value, δ may be set to 0.5, and when the index indicating the state of the road surface is smaller than the second threshold value, δ may be set to 0.

Further, when an index indicating the state of the security of the area in which the point is included is greater than the first threshold value, δ may be set to 1, when this index is equal to or smaller than the first threshold value and equal to or greater than a second threshold value smaller than the first threshold value, δ may be set to 0.5, and when the index is smaller than the second threshold value, δ may be set to 0.

The allowable area determination unit 11a obtains the evaluation value f based on Equation (1). As a function $F(\alpha, \beta, \gamma, \delta)$ in Equation (1), for example, a function for obtaining a sum of arguments α, β, γ, and δ or a function for obtaining an average value or weighted average value of the arguments α, β, γ, and δ can be used. For example, the evaluation value f is determined to be lower as safety of traveling of the vehicle 20 at the point is higher. Further, the evaluation value f may be determined to be higher as the safety of traveling of the vehicle 20 at the point is higher.

Then, in step S503, the allowable area determination unit 11a compares the evaluation value f of the point with a first reference for each of the points disposed in the predetermined region to determine whether the point is a point at which travelling of the vehicle 20 is allowed, which is a first allowable point at which travelling of the vehicle 20 is not allowed when the person gets on the vehicle. For example, when a determination is made that the evaluation value f is lower as the safety of traveling of the vehicle 20 at the point is higher, the allowable area determination unit 11a determines that the point is the first allowable point when the evaluation value f of the point is equal to or smaller than a first reference value equal to or greater than a second reference value smaller than the first reference value. Further, when a determination is made that the evaluation value f is higher as the safety of traveling of the vehicle 20 at the point is higher, the allowable area determination unit 11a determines that the point is the first allowable point when the evaluation value f of the point is equal to or greater than a first reference value equal to or lower than a second reference value greater than the first reference value.

The allowable area determination unit 11a may compare any one of α, β, γ, and δ with the first reference for each point to determine whether or not the point is the first allowable point, instead of obtaining the evaluation value f of the point using Equation (1). In this case, for the first reference, the first threshold value and the second threshold value used in the description of α, β, γ, and δ may be used as the first reference and the second reference described above.

Then, in step S505, the allowable area determination unit 11a compares the evaluation value f of the point with the second reference different from the first reference for each of the points disposed in the predetermined region, and determines whether the point is a point at which travelling of the vehicle 20 is allowed, which is a second allowable point at which travelling of the vehicle 20 is allowed when the person gets on the vehicle. For example, when a determination is made that the evaluation value f is lower as the safety of traveling of the vehicle 20 at the point is higher, the allowable area determination unit 11a determines that the point is the second allowable point when the evaluation value f of the point is smaller than the second reference value described above. Further, when a determination is made that the evaluation value f is higher as the safety of traveling of the vehicle 20 at the point is higher, the allowable area determination unit 11a determines that the point is the second allowable point when the evaluation value f of the point is greater than the second reference value described above.

The allowable area determination unit 11a may compare any one of α, β, γ, and δ with the second reference for each point to determine whether or not the point is the second allowable point, instead of obtaining the evaluation value f of the point using Equation (1). In this case, for the second reference, the second threshold value used in the description of α, β, γ, and δ may be used as the second reference described above.

Then, in step S507, the allowable area determination unit 11a determines whether or not the number of second allowable points included in the region is smaller than a total number of points included in the region by a predetermined proportion.

When the number of second allowable points included in the region is smaller than the number of first allowable points included in the region by a predetermined proportion (step S507—Yes), the allowable area determination unit 11a changes the point determined to be the second allowance point to the first allowance point (step S509). This is because, when a small number of second allowable points and a large number of first allowable points are both present in one region, a route along which the vehicle 20 on which a person gets travels is limited, and thus, a route felt roundabout for the occupant is likely to be created. Therefore, in such a region, it is possible to give occupants a safe getting-on feeling by not allowing the traveling of the vehicle 20 on which a person gets. The predetermined proportion can be, for example, 10% to 50%.

On the other hand, when the number of second allowable points included in the region is not smaller than the number of first allowable points included in the region by the predetermined proportion (No in step S507), the process proceeds to step S511. The process of step S507 may be omitted.

Then, in step S511, the allowable area determination unit 11a determines the first allowable area A1 to include the first allowable point.

Then, in step S513, the allowable area determination unit 11a determines the second allowable area A2 to include the second allowable point.

Then, in step S515, the allowable area determination unit 11a transmits information indicating the first allowable area A1 and the second allowable area A2 to the vehicle 20 via the network N using the communication I/F 15. The vehicle 20 is allowed to travel in the first allowable area A1 and the second allowable area A2 when the person does not get on the vehicle, and is allowed travel in the second allowable area A2 when the person gets on the vehicle.

The allowable area determination unit 11a may perform the process of step S513 before the process of step S511. Further, the allowable area determination unit 11a may perform the process of step S511 and the process of step S513 in parallel.

In the region, the allowable area determination unit 11a determines an area other than the first allowable area A1 and the second allowable area A2 as the non-allowable area R in which the travelling of the vehicle 20 is not allowed.

Figure 6:
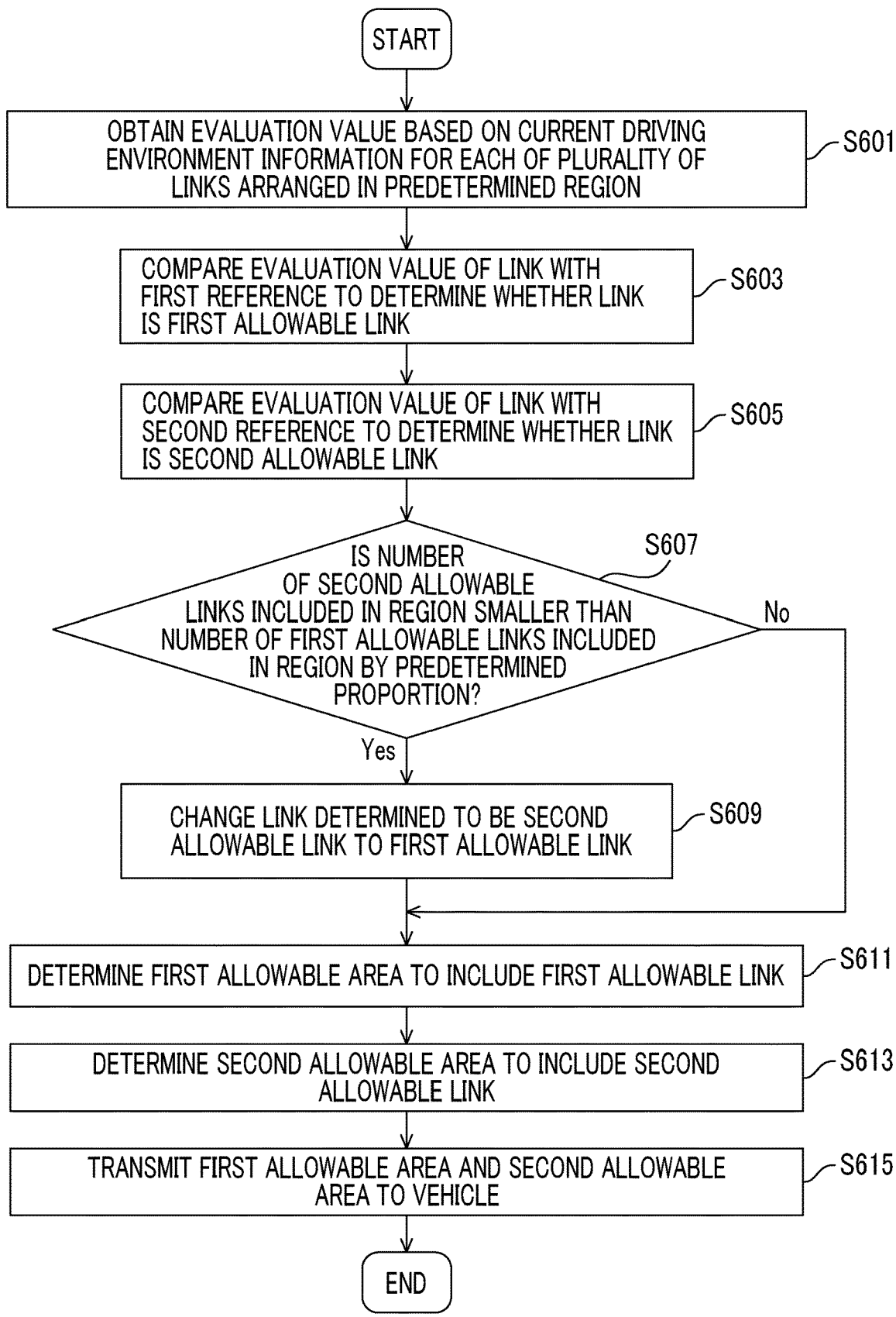
FIG. 6 is a flowchart (2) illustrating the operation of the server.

Next, a second processing example in which the server 10 in the system 1 described above determines the first allowable area A1 and the second allowable area A2 based on the driving environment information will be described below with reference to the flowchart illustrated in FIG. 6.

The second processing example is different from the first processing example described above in that the allowable area determination unit 11a obtains an evaluation value for each of links connecting between adjacent nodes disposed in a predetermined region and determines the first allowable area A1 and the second allowable area A2 based on the evaluation value of this link. The description of the first processing example is appropriately applied to the description of the second processing example by replacing the points with the links in the description of the first processing example described above.

First, in step S601, the allowable area determination unit 11a of the controller 11 in the server 10 obtains an evaluation value for each of a plurality of links disposed in a predetermined region based on the current driving environment information. Description of the driving environment information of the point described above is appropriately applied as the driving environment information of the link by reading the point as links. The allowable area determination unit 11a acquires the position information of the link by referring to the map data 12b stored in the storage unit 12. Here, as the position of the link for acquiring the driving environment information, the allowable area determination unit 11a may use a position of any one of the nodes at both ends or an average value of the positions of the nodes located at both ends of the link.

Then, in step S603, the allowable area determination unit 11a compares the evaluation value of the link with a first reference for each of the links disposed in the predetermined region, and determines whether the link is a link at which travelling of the vehicle 20 is allowed, which is a first allowable link at which travelling of the vehicle 20 is not allowed when a person gets on the vehicle.

The allowable area determination unit 11a may compare any one of α, β, γ, and δ with the first reference for each link to determine whether or not the link is the first allowable link, instead of obtaining the evaluation value f of the link using Equation (1).

Then, in step S605, the allowable area determination unit 11a compares the evaluation value of the link with a second reference different from the first reference for each of the links disposed in the predetermined region, and determines whether the link is a link at which travelling of the vehicle 20 is allowed, which is a second allowable link at which travelling of the vehicle 20 is allowed when a person gets on the vehicle.

Then, in step S607, the allowable area determination unit 11a determines whether or not the number of second allowable links included in the region is smaller than the number of first allowable links included in the region by a predetermined proportion.

When the number of second allowable links included in the region is smaller than the number of first allowable links included in the region by a predetermined proportion (step S607—Yes), the allowable area determination unit 11a changes the link determined as the second allowable link into the first allowable link (step S609). This is because, when a small number of second allowable links and a large number of first allowable links are both present in one region, a route along which the vehicle 20 on which a person gets travels is limited, and as a result, a route felt roundabout for the occupant is likely to be searched for. Therefore, in such a region, the occupant is given a safe getting-on feeling by not allowing the traveling of the vehicle 20 when the person gets on the vehicle. The predetermined proportion can be, for example, 10% to 50%.

On the other hand, when the number of second allowable links included in the region is not smaller than the number of first allowable links included in the region by the predetermined proportion (step S607-No), the process proceeds to step S611.

Then, in step S611, the allowable area determination unit 11a determines the first allowable area A1 to include the first allowable link.

Then, in step S613, the allowable area determination unit 11a determines the second allowable area A2 to include the second allowable link.

Then, in step S615, the allowable area determination unit 11a transmits information indicating the first allowable area A1 and the second allowable area A2 to the vehicle 20 via the network N using the communication I/F 15. The vehicle 20 is allowed to travel in the first allowable area A1 and the second allowable area A2 when the person does not get on the vehicle, and is allowed travel in the second allowable area A2 when the person gets on the vehicle.

The above is description of the process in which the server 10 determines the first allowable area A1, the second allowable area A2, and the non-allowable area R.

Figure 7:
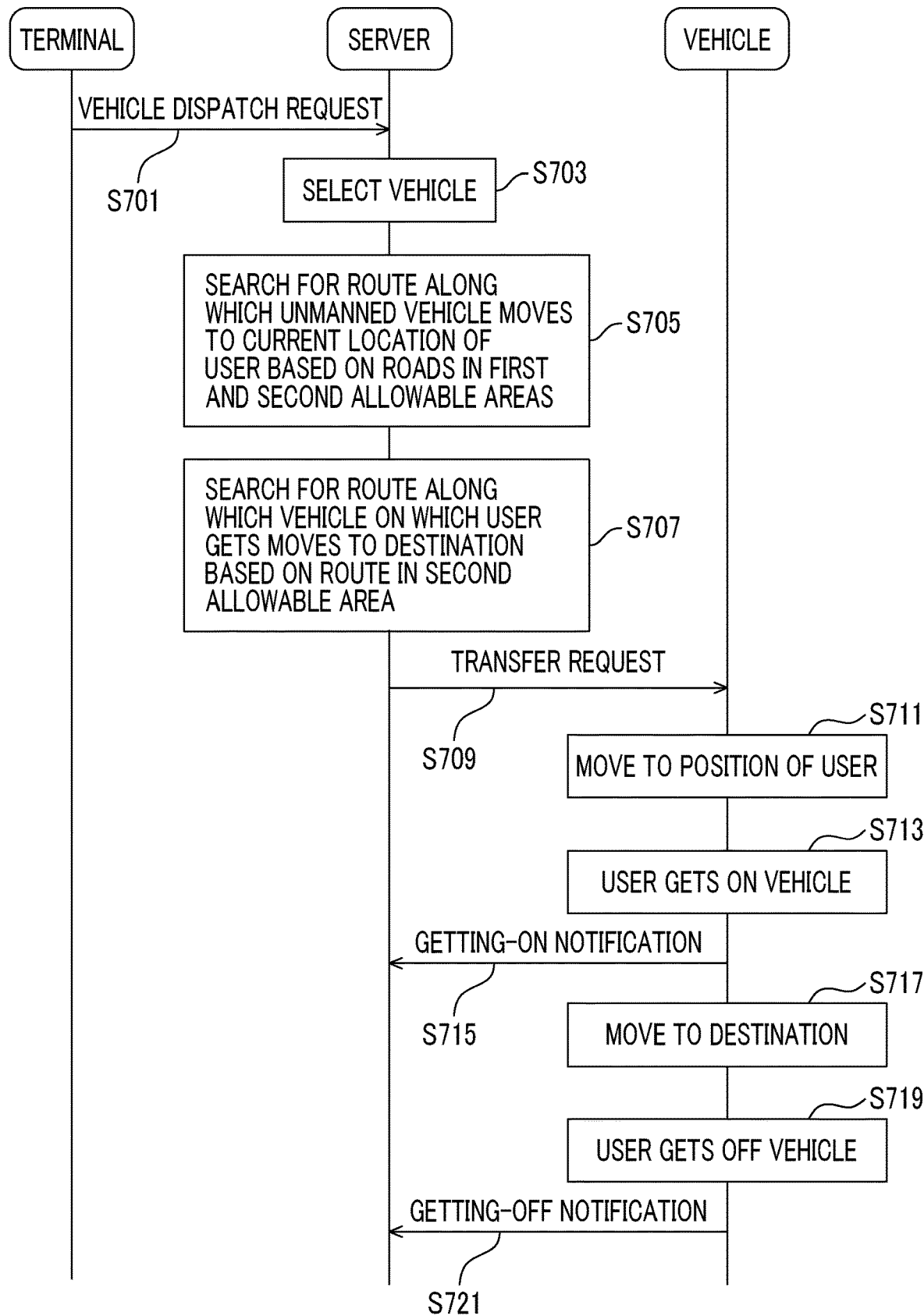
FIG. 7 is a sequence diagram illustrating an operation of a system.

Next, an operation example in which a mobility service for transferring the user 40 to the destination using the vehicle 20 is provided by the system 1 will be described below with reference to a sequence diagram illustrated in FIG. 7.

First, in step S701, the user 40 transmits information indicating the current location and the destination to the server 10 via the network N, together with a vehicle dispatch request for requesting transfer of the user 40 from the current location to the destination using the terminal 30. As the information indicating the current location and the destination, for example, a facility name, an address, or a combination of longitude and latitude can be used.

Then, in step S703, the vehicle dispatch service unit 11b of the controller 11 in the server 10 searches for vehicles 20 present within a certain distance from the current location of the user 40, and selects an available unmanned vehicle 20 from among at least one vehicle 20 that has been searched for.

Figure 8:
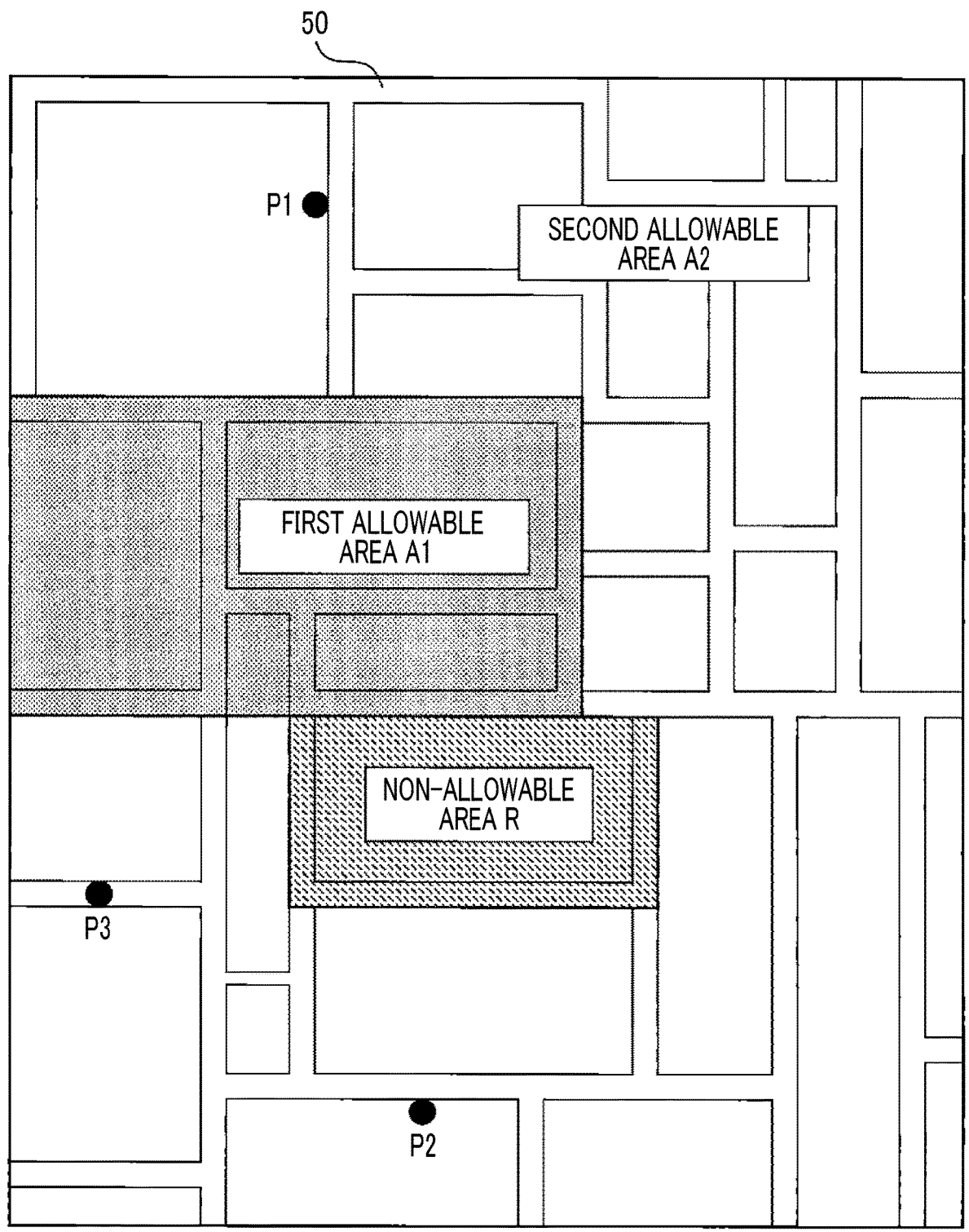
FIG. 8 is a diagram (1) illustrating an operation of the system.

FIG. 8 illustrates a map 50 including the current location P1 of the user 40, the destination P2, and a selected current location P3 of the vehicle 20. The map 50 includes the first allowable area A1, the second allowable area A2, and the non-allowable area R. The current location P1 of the user 40, the destination P2, and the current location P3 of the vehicle 20 are included in the second allowable area A2.

Then, in step S705, the route search unit 11c of the controller 11 in the server 10 searches for the route along which the unmanned vehicle 20 moves from the current location P3 of the vehicle 20 to the current location P1 of the user 40 not to pass through the non-allowable area R based on the road in the first allowable area A1 and the second allowable area A2 by referring to the map data 12b. For example, the route search unit 11c may search for a route using a Dijkstra method.

Figure 9:
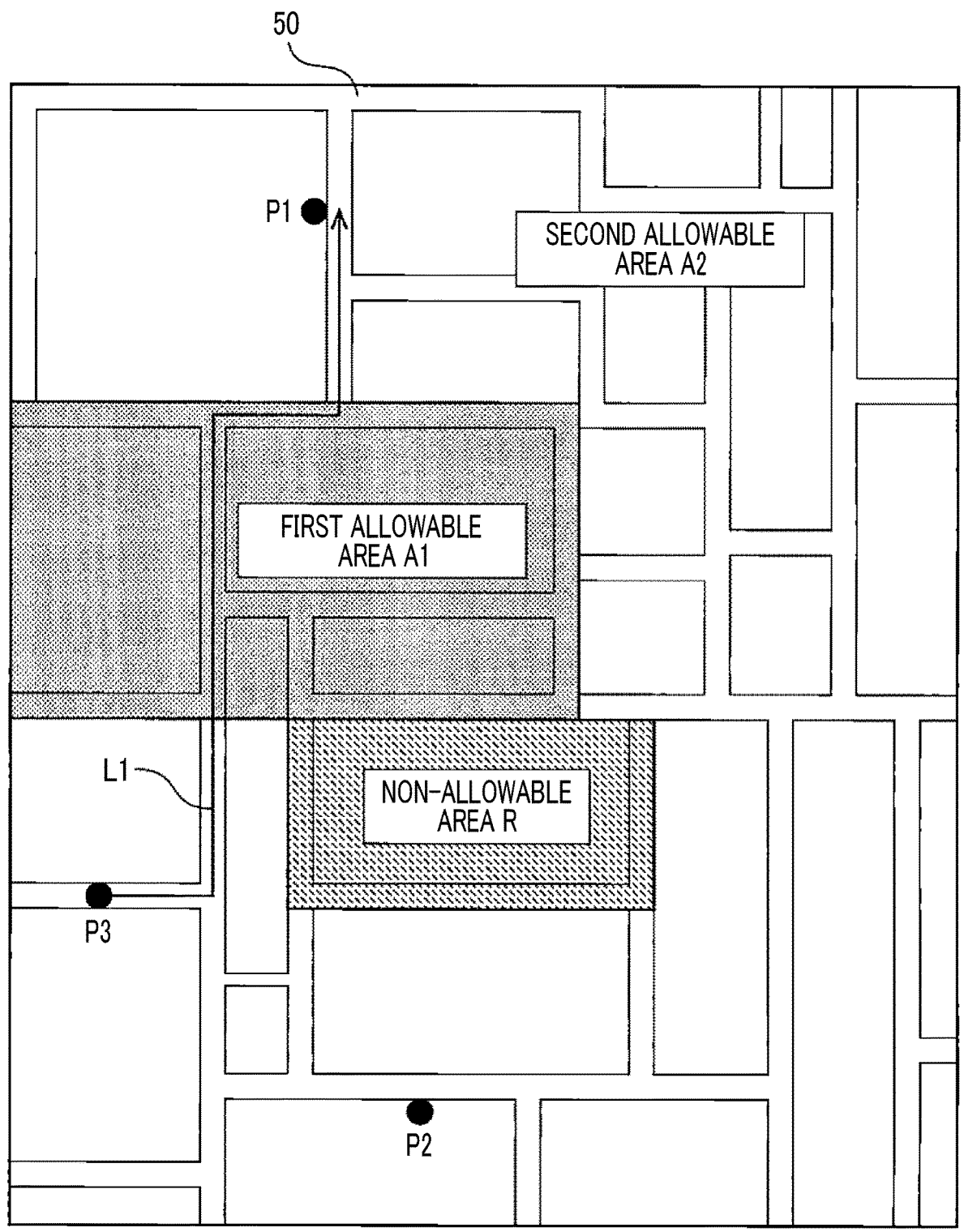
FIG. 9 is a diagram (2) illustrating the operation of the system.

FIG. 9 illustrates a route L1 searched for by the route search unit 11c.

The vehicle 20 on which a person does not get is allowed to travel in the second allowable area A2 together with the first allowable area A1. The route search unit 11c searches for the route L1 having the shortest distance so that the vehicle passes through the first allowable area A1 from the point in the second allowable area A2 in which the current location P3 of the vehicle 20 is located and reaches the point in the second allowable area A2 in which the current location P1 of the user 40 is located.

Then, in step S707, the route search unit 11c searches for the route along which the vehicle 20 on which the user 40 has got moves from the current location P1 of the user 40 to the destination P2 not to pass through the non-allowable area R based on the road in the second allowable area A2 by referring to the map data 12b.

Figure 10:
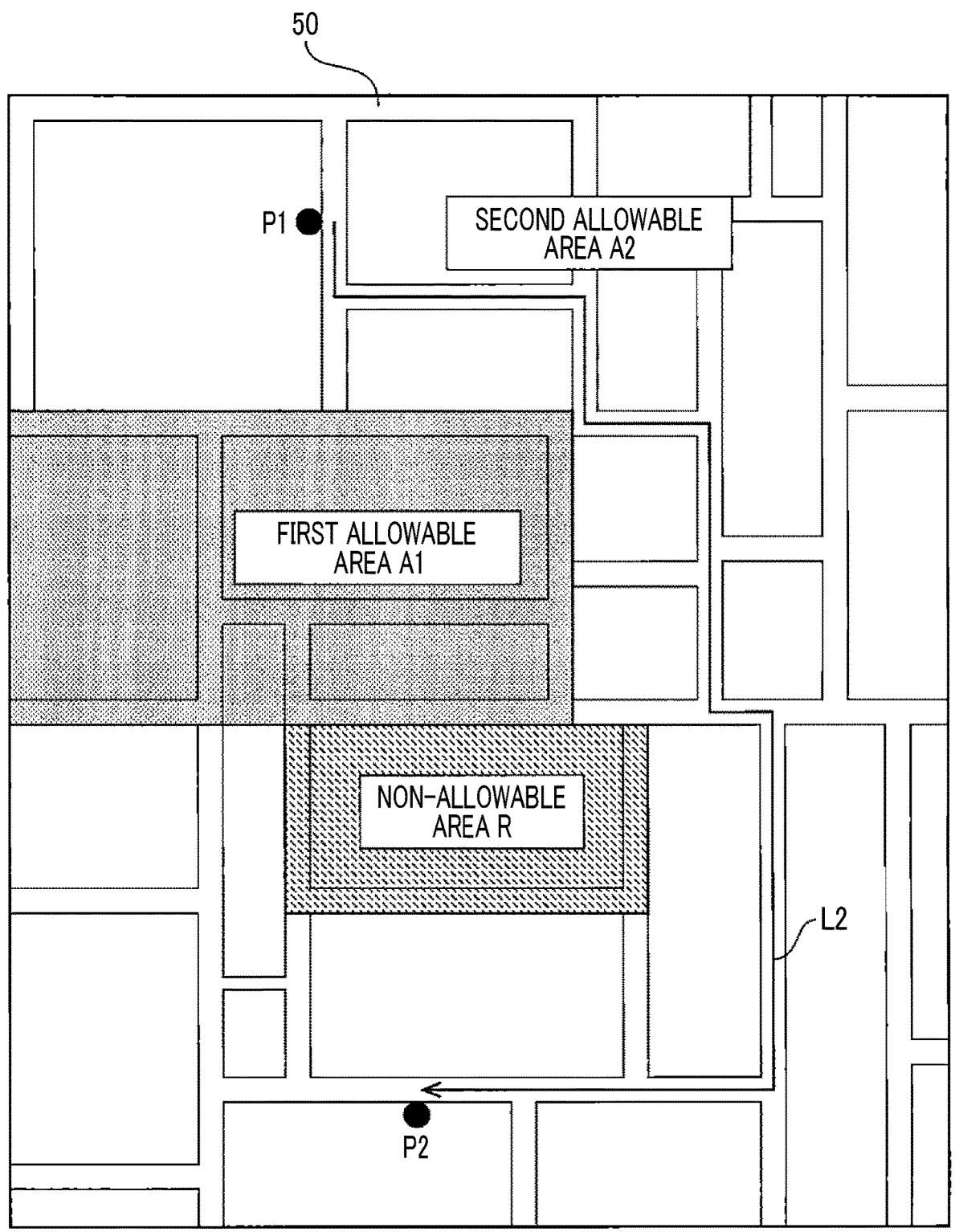
FIG. 10 is a diagram (3) illustrating the operation of the system.

FIG. 10 illustrates a route L2 searched for by the route search unit 11c.

The vehicle 20 on which a person gets is allowed to travel in the second allowable area A2, but is not allowed to travel in the first allowable area A1. The route search unit 11c searches for the route L2 in the second allowable area A2 in which a distance is shortest such that the current location P1 of the user 40 reaches the destination P2 from the position.

The allowable area determination unit 11a may perform the process of step S707 before the process of step S705. Further, the allowable area determination unit 11a may perform the process of step S705 and the process of step S707 in parallel.

Then, in step S709, the vehicle dispatch service unit 11b transmits information indicating the route L1 and the route L2 to the vehicle 20 via the network N together with a transfer request for requesting the vehicle 20 to move to the current location P1 of the user 40 and transfer the user 40 getting on the vehicle to the destination P2.

Then, in step S711, the vehicle 20 that has received the vehicle dispatch request travels on the route L1 from the current location P3 of the vehicle 20 to the current location P1 of the user 40.

Then, in step S713, the user 40 gets on the vehicle 20.

Then, in step S715, when the autonomous driving controller 21 of the vehicle 20 detects that the user 40 gets on the vehicle 20 based on the image captured by the in-vehicle camera (not illustrated), the autonomous driving controller 21 transmits a getting-on notification indicating that the user 40 has got on the vehicle 20 to the server 10 via the network N. The server 10 receives the getting-on notification, and determines that the vehicle 20 is in a state in which the person has got on the vehicle 20.

Then, in step S717, the vehicle 20 travels along the route L2 from the current location P1 of the user 40 to the destination P2.

Then, in step S719, the user 40 gets off the vehicle 20 at the destination P2.

Then, in step S721, when the autonomous driving controller 21 of the vehicle 20 detects that the user 40 gets off the vehicle 20 based on the image captured by the in-vehicle camera (not illustrated), the autonomous driving controller 21 transmits a getting-off notification indicating that the user 40 has got off the vehicle 20 to the server 10 via the network N. The server 10 receives the getting-off notification, and determines that the vehicle 20 is in a state in which there is no person in the vehicle 20.

With the system of the embodiment described above, since the autonomous driving vehicle is allowed to travel within the allowable area in which the information on the surroundings can be accurately acquired, safe traveling is secured. Further, with the system of the embodiment, since the second allowable area in which the occupant is given a safe getting-on feeling is determined in the allowable area, and the autonomous driving vehicle on which a person has got is allowed to travel in the second allowable area, it is possible to give occupants a safe getting-on feeling. Further, with the system of the embodiment, the autonomous driving vehicle in which no person gets on is allowed to travel within the first allowable area together with the second allowable area, it is possible to widen a selection width of the travel route.

In the present disclosure, the traffic information determination device, the traffic information system, and the method of determining traffic information using a processor according to the above-described embodiment can be appropriately modified without departing from the scope of the present disclosure.

For example, in the embodiment described above, the weather information, the traffic information, the time information, and the region information are used as the driving environment information, but the driving environment information is not limited to these pieces of information. The driving environment information may include other information as long as the information can affect the safety of traveling of the vehicle to be subjected to autonomous driving control. Further, the weather information, the traffic information, the time information, and the region information are not limited to the specific information described above. The weather information, the traffic information, the time information, and the region information may further include other specific information.

Further, although the server searches for the route of the vehicle on which the user has got on the vehicle in the above-described embodiment, the vehicle may search for the route based on the current location and the destination of the user.

In the first aspect, the server may be configured to acquire obtain an evaluation value for evaluating a degree of safety of traveling of the vehicle at each point based on the driving environment information, compare the evaluation value of the point with a first reference for each point to determine whether or not the point is a first allowable point in which travelling of the vehicle is allowed and in which travelling of the vehicle is not allowed when a person gets on the vehicle, compare the evaluation value of the point with a second reference different from the first reference for each point to determine whether or not the point is a second allowable point in which travelling of the vehicle is allowed and in which travelling of the vehicle is allowed even when a person gets on the vehicle, determine the first allowable area to include the first allowable point, and determine the second allowable area to include the second allowable point.

In the first aspect, a region including an area that is determined to be the first allowable area or the second allowable area may include a route along which the vehicle travels, the route may be formed by connecting links connecting adjacent nodes based on map information having information on a link connecting a node and an adjacent node, the server may be configured to calculate an evaluation value for evaluating a degree of safety of traveling of the vehicle for each link based on the driving environment information, compare the evaluation value of the link with a first reference for each link to determine whether or not the link is a first allowable link in which travelling of the vehicle is allowed and in which travelling of the vehicle is not allowed when a person gets on the vehicle, compare the evaluation value of the link with a second reference different form the first reference for each link to determine whether or not the link is a second allowable link in which travelling of the vehicle is allowed and in which travelling of the vehicle is allowed even when a person gets on the vehicle, determine the first allowable area to include the first allowable link, and determine the second allowable area to include the second allowable link.

In the first aspect, the server may be configured to change the link determined as the second allowable link to the first allowable link when the number of the second allowable links included in the region is smaller than the number of first allowable links included in the region by a predetermined proportion.

In the first aspect, the server may be configured to search for a route along which the vehicle on which no person gets travels, based on roads in the first allowable area and the second allowable area, and search for a route along which the vehicle on which a person gets travels based on roads in the second allowable area.

What is claimed is:

1. A traffic information determination device comprising a server configured to:
    acquire driving environment information that affects traveling of a vehicle subjected to autonomous driving control,
    determine a first allowable area in which traveling of the vehicle is allowed when the vehicle is unoccupied, and in which traveling of the vehicle is not allowed when a person occupies the vehicle, based on the driving environment information, and
    determine a second allowable area in which traveling of the vehicle is allowed when the vehicle is unoccupied, and in which traveling of the vehicle is avowed the person occupies the vehicle, based on the driving environment information, and
    transmit the first allowable area and the second allowable area to the vehicle for autonomously controlling the vehicle within the first allowable area and the second allowable area, the autonomous control comprising:
        generating a route for the vehicle based on the first allowable area and the second allowable area;
        controlling a steering of the vehicle, to travel along the route; and
        controlling a speed of the vehicle based on a comparison between a steering angle and an angular velocity of the vehicle.

2. The traffic information determination device according to claim 1, wherein the server is configured to:
obtain an evaluation value for evaluating a degree of safety of traveling of the vehicle at each point based on the driving environment information,
compare the evaluation value of the point with a first reference for each point to determine whether or not the point is a first allowable point in which travelling of the vehicle is avowed and in which travelling of the vehicle is not allowed when the person occupies the vehicle,
compare the evaluation value of the point with a second reference different from the first reference for each point to determine whether or not the point is a second allowable point in which travelling of the vehicle is allowed and in which travelling of the vehicle is allowed when the person occupies the vehicle,
determine the first allowable area to include the first allowable point, and
determine the second allowable area to include the second allowable point.

3. The traffic information determination device according to claim 1, wherein:
a region including an area that is determined to be the first allowable area or the second allowable area includes the route along which the vehicle travels;
the route is formed by connecting links connecting adjacent nodes based on map information having information on a link connecting a node and an adjacent node; and
the server is configured to:
calculate an evaluation value for evaluating a degree of safety of traveling of the vehicle for each link based on the driving environment information,
compare the evaluation value of the link with a first reference for each link to determine whether or not the link is a first allowable link in which travelling of the vehicle is allowed and in which travelling of the vehicle is not allowed when the person occupies the vehicle,
compare the evaluation value of the link with a second reference different from the first reference for each link to determine whether or not the link is a second allowable link in which travelling of the vehicle is avowed and in which travelling of the vehicle is avowed when the person occupies the vehicle,
determine the first allowable area to include the first allowable link, and
determine the second allowable area to include the second allowable link.

4. The traffic information determination device according to claim 3, wherein the server is configured to change the link determined as the second allowable link to the first allowable link when the number of the second allowable links included in the region is smaller than the number of first allowable links included in the region by a predetermined proportion.

5. The traffic information determination device according to claim wherein the server is configured to search for the route along which the vehicle is unoccupied by the person, based on roads in the first allowable area and the second allowable area, and
search for the route along which the vehicle on which the person travels based on roads in the second allowable area.

6. A traffic information system comprising:
a vehicle configured to perform autonomous driving control; and
a server including a communication device, wherein:
the server is configured to:
acquire driving environment information that affects safety of traveling of the vehicle,
determine a first allowable area in which traveling of the vehicle is avowed when the vehicle is unoccupied, and in which traveling of the vehicle is not allowed when a person occupies the vehicle, based on the driving environment information,
determine a second allowable area in which traveling of the vehicle is avowed when the vehicle is unoccupied, and in which traveling of the vehicle is avowed when the occupies the vehicle, based on the driving environment information, and transmit the first allowable area and the second allowable area to the vehicle via the communication device; and the vehicle is configured to:
communicate with the server,
based on receiving the first allowable area from the server,
perform autonomous travel within the first allowable area and the second allowable area when the vehicle is unoccupied by a person, and
based on receiving the second allowable area from the server, perform autonomous travel within the second allowable area when a the vehicle is occupied by the person,
the performing autonomous travel comprising:
generating a route for the vehicle based on the first allowable area and the second allowable area;
controlling a steering of the vehicle to travel along the route; and
controlling a speed of the vehicle based on a comparison between a steering angle and an angular velocity of the vehicle.

7. A method of determining traffic information using a processor comprising:
determining, by the processor, a first allowable area in which traveling of a vehicle to be subjected to autonomous driving control is allowed when the vehicle is unoccupied, and in which traveling of the vehicle is not avowed when a person occupies the vehicle, based on driving environment information that affects traveling of the vehicle;
determining, by the processor, a second allowable area in which traveling of the vehicle is allowed when the vehicle is unoccupied, and in which traveling of the vehicle is avowed when the person occupies the vehicle, based on the driving environment information; and
transmitting, by the processor, the first allowable area and the second allowable area to a vehicle for autonomously controlling the vehicle within the first allowable area and the second allowable area, the autonomous control comprising:
generating a route for the vehicle based on the first allowable area and the second allowable area;
controlling a steering of the vehicle to travel along the route; and
controlling a speed of the vehicle based on a comparison between a steering angle and an angular velocity of the vehicle.

* * * * *